US007844432B1

(12) United States Patent  (10) Patent No.: US 7,844,432 B1
Jones  (45) Date of Patent: *Nov. 30, 2010

(54) NODE EMULATOR

(75) Inventor: Lawrence W. Jones, Woburn, MA (US)

(73) Assignee: Verizon Laboratories Inc., Waltham, MA (US)

( * ) Notice: Subject to any disclaimer, the term of this patent is extended or adjusted under 35 U.S.C. 154(b) by 572 days.

This patent is subject to a terminal disclaimer.

(21) Appl. No.: 10/869,806

(22) Filed: Jun. 16, 2004

Related U.S. Application Data

(63) Continuation-in-part of application No. 10/455,567, filed on Jun. 5, 2003.

(51) Int. Cl.
*G06G 7/48* (2006.01)
*G06G 7/62* (2006.01)
*G06F 17/50* (2006.01)
*H04L 12/28* (2006.01)
*H04L 12/56* (2006.01)

(52) U.S. Cl. .......................... 703/13; 703/6; 370/395.53

(58) Field of Classification Search ...................... 703/6, 703/13; 370/395.53
See application file for complete search history.

(56) References Cited

U.S. PATENT DOCUMENTS

| 5,128,932 A * | 7/1992 | Li .............................. 370/236 |
| 5,687,167 A * | 11/1997 | Bertin et al. ................. 370/254 |
| 5,748,617 A * | 5/1998 | McLain, Jr. .................. 370/244 |
| 5,754,831 A * | 5/1998 | Berman ........................ 703/13 |
| 5,774,695 A * | 6/1998 | Autrey et al. ................. 703/26 |
| 5,794,128 A * | 8/1998 | Brockel et al. ............. 455/67.11 |
| 5,838,919 A * | 11/1998 | Schwaller et al. ........... 709/224 |
| 5,850,538 A | 12/1998 | Steinman |
| 5,881,237 A * | 3/1999 | Schwaller et al. ........... 709/224 |
| 5,881,269 A * | 3/1999 | Dobbelstein .................. 703/21 |
| 5,889,954 A | 3/1999 | Gessel et al. |
| 5,892,763 A * | 4/1999 | Laraqui et al. .......... 370/395.53 |
| 6,252,851 B1 | 6/2001 | Siu et al. |
| 6,317,775 B1 | 11/2001 | Coile et al. |
| 6,343,078 B1 * | 1/2002 | Bronstein et al. ........... 370/400 |
| 6,414,942 B1 | 7/2002 | Ito et al. |
| 6,442,141 B1 | 8/2002 | Borella et al. |

(Continued)

FOREIGN PATENT DOCUMENTS

EP 1213875 6/2002

(Continued)

OTHER PUBLICATIONS

DACS Software Pvt. Ltd., webpage for "IP Network Emulator," (Copyright 2001-2005), http://www.dacsindia.com/products/ipemulator.htm.

(Continued)

*Primary Examiner*—David Silver

(57) ABSTRACT

Systems, methods, and apparatus are provided for emulating the performance effect on network traffic flow traversing a node in a communications network. According to one illustrative embodiment, a method of emulating traffic through a node is provided. The method includes generating foreground traffic through the node; simulating a first background traffic having a first weight at the node; simulating a second background traffic having a second weight at the node; determining an effect of the first and second background traffic on the foreground traffic; and making a forwarding decision with respect to the foreground traffic based on the effect.

20 Claims, 8 Drawing Sheets

U.S. PATENT DOCUMENTS

| | | | |
|---|---|---|---|
| 6,456,652 B1 * | 9/2002 | Kim et al. | 375/224 |
| 6,456,962 B1 | 9/2002 | Allingham et al. | |
| 6,466,925 B1 | 10/2002 | Harald et al. | |
| 6,502,181 B1 | 12/2002 | MacKenna et al. | |
| 6,549,882 B1 | 4/2003 | Chen et al. | |
| 6,578,068 B1 * | 6/2003 | Bowman-Amuah | 709/203 |
| 6,606,316 B1 | 8/2003 | Albert et al. | |
| 6,615,166 B1 * | 9/2003 | Guheen et al. | 703/27 |
| 6,683,856 B1 * | 1/2004 | Brinkman et al. | 370/249 |
| 6,687,227 B1 | 2/2004 | Li et al. | |
| 6,795,870 B1 * | 9/2004 | Bass et al. | 710/6 |
| 6,804,249 B1 * | 10/2004 | Bass et al. | 370/412 |
| 6,820,042 B1 | 11/2004 | Cohen et al. | |
| 6,862,564 B1 * | 3/2005 | Shue et al. | 703/25 |
| 6,865,185 B1 | 3/2005 | Patel et al. | |
| 6,901,357 B1 * | 5/2005 | Patiejunas | 703/14 |
| 6,909,691 B1 * | 6/2005 | Goyal et al. | 370/230 |
| 6,922,663 B1 | 7/2005 | Maurer | |
| 6,925,431 B1 * | 8/2005 | Papaefstathiou | 703/17 |
| 6,996,514 B2 * | 2/2006 | Gruber | 703/19 |
| 7,013,257 B1 | 3/2006 | Nolan et al. | |
| 7,142,513 B2 | 11/2006 | Sun et al. | |
| 7,209,874 B2 | 4/2007 | Salmonsen | |
| 7,219,047 B2 | 5/2007 | Cohen et al. | |
| 7,287,061 B2 | 10/2007 | Tsubota | |
| 7,313,635 B1 * | 12/2007 | Zavalkovsky | 709/248 |
| 7,555,420 B2 | 6/2009 | Wang et al. | |
| 2002/0055999 A1 | 5/2002 | Takeda | |
| 2002/0091506 A1 * | 7/2002 | Gruber | 703/19 |
| 2002/0103631 A1 * | 8/2002 | Feldmann et al. | 703/22 |
| 2002/0143513 A1 | 10/2002 | Cohen et al. | |
| 2002/0176431 A1 | 11/2002 | Golla et al. | |
| 2002/0198694 A1 * | 12/2002 | Yang et al. | 703/6 |
| 2003/0018458 A1 * | 1/2003 | Cutlip | 703/13 |
| 2003/0137982 A1 * | 7/2003 | Sala et al. | 370/392 |
| 2003/0174650 A1 * | 9/2003 | Shankar et al. | 370/235 |
| 2003/0223453 A1 * | 12/2003 | Stoler et al. | 370/444 |
| 2003/0231593 A1 * | 12/2003 | Bauman et al. | 370/235 |
| 2004/0088605 A1 * | 5/2004 | Nakamoto et al. | 714/43 |
| 2004/0120319 A1 | 6/2004 | Asawa et al. | |
| 2004/0190537 A1 | 9/2004 | Ferguson et al. | |
| 2004/0210665 A1 * | 10/2004 | Fujinami et al. | 709/230 |
| 2004/0218608 A1 * | 11/2004 | Patiejunas | 370/395.21 |
| 2005/0141469 A1 | 6/2005 | Miller et al. | |
| 2005/0198246 A1 * | 9/2005 | Kegel | 709/223 |
| 2005/0265355 A1 * | 12/2005 | Havala et al. | 370/395.53 |
| 2006/0067351 A1 | 3/2006 | Liu et al. | |
| 2006/0072466 A1 | 4/2006 | Wang et al. | |
| 2006/0072628 A1 | 4/2006 | Liu et al. | |

FOREIGN PATENT DOCUMENTS

| | | | |
|---|---|---|---|
| EP | 1213875 A2 * | 6/2002 | |

OTHER PUBLICATIONS

Press release from Shunra Software Ltd., "Shunra™ Launches First Solution that Replicates the Production Environment in the Lab, to Optimize Networked Application Performance and Eliminate Failed Deployments," dated Apr. 14, 2003, http://www.shunra.com//news.apx?newsType=1&newsID=188.

Joe, I., "Packet Loss and Jitter Control for Real-Time MPEG Video Communication", Computer Communication 19 (1996), pp. 901-914, 1996 Elsevier Science.

Simmonds et al., "Applying Parallel Discrete Event Simulation to Network Emulation", 2000 IEEE, 8 pages.

Zheng et al., "Test and Evaluation of Wide Area Networks Using Emulator Cluster", 2003 IEEE, pp. 281-285.

Albertengo et al., "ACE/2: A Scalable Modular SATCOM System Emulator," 2002 IEEE.

* cited by examiner

NODE EMULATOR

RELATED APPLICATION

This application is a continuation-in-part of application Ser. No. 10/455,567 filed Jun. 5, 2003, which is herein incorporated by reference.

BACKGROUND

Event driven "simulation," a type of computer-based modeling, has become a key tool in the design of data communication networks. Simulation is preferred because of the expense and complexity of constructing a physical model to determine the manner in which a proposed network behaves under certain stimulus. This in turn allows one to discern how its components should be constructed and configured.

For example, prior to purchasing an internet protocol (IP) node (the term "node" refers to, for example, a switch or router) to connect a LAN to the Internet, it is necessary to estimate the bandwidth required for the ports of the IP node or else risk purchasing hardware and bandwidth capacity unsuitable for its intended purpose. It is also useful to study the impact of adding additional load (e.g., increased traffic as a result of additional users, applications, etc.) to an existing network prior to actually obtaining or connecting the resources that would cause the extra load.

Accordingly, use of network simulation applications (also referred to herein as "simulators") such as Opnet™ (from Opnet Technologies) and Network Simulator ("ns") are widespread. Such network simulator applications are software-based and permit a user to configure and model an entire network. Thus, on a single personal computer, using a simulation application, a user can simulate the construction of an entire network, determine the viability of particular configurations, evaluate bandwidth/buffer resource allocations, and, in general, compare design options. A simulation application also enables the user to generate traffic patterns, monitor traffic flow, congestion, and discards (if any) at all nodes (or at least all those of interest to a particular analysis) in the simulated network. A "discard" of a packet occurs when a node experiences an overflow condition and fails to forward the packet, for example, by overwriting the packet with an incoming packet. Based on the simulation, a user can make decisions regarding construction of an actual physical network, as well as the configuration of a particular node in terms of necessary bandwidth, queue size, port speed, link capacity, etc., without ever having to construct a physical model.

Network simulation applications, however, generally do not run in real time, and event-driven simulators in particular are designed to model the passage of every packet through the simulated network. Accordingly, simulation applications, due to the increasing network complexity and high speed data transfer rates, require extensive CPU cycles to capture functional details (e.g. traffic characteristics and network element behaviors).

Network emulators, on the other hand, generally perform an abstracted network behavior or function in real-time while typically interfaced to and working in cooperation with actual operational network equipment. This is generally achieved by implementing some of the emulator functionality in hardware and/or embedded firmware in a manner such that it can interface and function as a "black box" that performs its intended tasks in real-time, while some other aspects might be abstracted and modeled internally to create the desired external effect.

SUMMARY

Systems, methods, and apparatus are provided for emulating the performance effect on network traffic flow traversing a node in a communications network. According to one illustrative embodiment, a method of emulating traffic through a node is provided. The method includes generating foreground traffic through the node; simulating a first background traffic having a first weight at the node; simulating a second background traffic having a second weight at the node; determining an effect of the first and second background traffic on the foreground traffic; and making a forwarding decision with respect to the foreground traffic based on the effect.

In accordance with another illustrative embodiment, a node emulator is provided that includes an ingress media interface; a packet queue to receive incoming foreground traffic from the ingress media interface; an egress media interface; at least first and second background traffic generators to simulate first and second background traffic having first and second weights associated therewith at the node emulator; and a foreground packet scheduler forwarder to cause foreground traffic to be forwarded from the packet queue to the egress media interface.

In accordance with another illustrative embodiment, a method of emulating network traffic through a node is provided that includes generating foreground traffic through the node; assigning a first weight to the foreground traffic; simulating background traffic at the node; assigning a second weight to the background traffic; determining an effect of the background traffic on the foreground traffic; and making a forwarding decision with respect to the foreground traffic based on the effect.

In accordance with another illustrative embodiment, a node emulator is provided that includes an ingress media interface; a packet queue to receive incoming foreground traffic having a first weight associated therewith from the ingress media interface; an egress media interface; a background traffic generator to simulate background traffic having a second weight associated therewith at the node emulator; and a foreground packet scheduler forwarder to cause foreground traffic to be forwarded from the packet queue to the egress media interface.

In accordance with another illustrative embodiment, a system to emulate the effect of background traffic on foreground traffic is provided that includes a client to generate foreground traffic; a node emulator coupled to the client to receive and forward the foreground traffic having a first weight associated therewith and to simulate a background traffic having a second weight associated therewith; and a server coupled to the node to receive foreground traffic forwarded from the node emulator.

BRIEF DESCRIPTION OF THE DRAWINGS

The accompanying drawings, which are incorporated in and constitute a part of this specification, illustrate several embodiments consistent with the invention and together with the description, serve to explain the principles consistent with the invention.

DETAILED DESCRIPTION

Reference will now be made in detail to several illustrative embodiments of consistent with the present invention, examples of which are shown in the accompanying drawings. Wherever possible, the same reference numbers will be used throughout the drawings to refer to the same or like parts.

In accordance with certain illustrative embodiments consistent with the present invention, systems, methods and apparatii are provided for emulating the performance effect on network traffic flow traversing a node (such as a frame relay, ATM and/or IP router) in a communications network. The term "node" as used herein refers to any network device that receives and forwards data packets (most commonly IP packets), cells, or frames (depending on the transport technology used) from one location to another. It should be noted that the term "data packet" used herein refers to any and all types of units of transmitted data, including, without limitation, data packets, cells, and frames. A physical node (herein referred to as a "node emulator") is provided in order to pass traffic of interest from a source or client (foreground traffic) and demonstrate the effect that simulated background traffic (which is intended to model all other traffic received at the node) has on the foreground traffic.

In one illustrative embodiment, the node emulator models the queuing dynamics at an egress port of the node emulator by simulating background traffic in real time—internal to the node emulator—and making forwarding decisions with respect to the foreground traffic dependent on the background traffic. The node emulator minimizes the amount of computations used to simulate high utilization background traffic scenarios by approximating the background process according to a fluid model, thereby limiting per-packet computations to foreground packets. The background traffic can be modeled as a time-varying rate process that is updated periodically.

Figure 1:
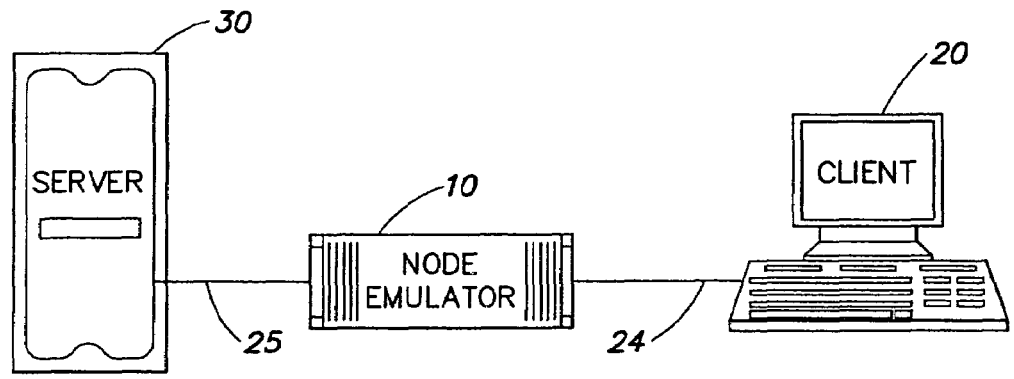
FIG. 1 is schematic diagram illustrating a system in which a node emulator is connected in accordance with one illustrative embodiment.

FIGS. 1-6 show illustrative embodiments of a system, method, and apparatus consistent with principles of the present invention. The system, shown in FIG. 1, is a communications network utilizing a node emulator 10 which is physically connected to a client 20 and a server 30. Client 20 and server 30 are connected to node emulator 10 via, for example, bidirectional Fast Ethernet links 24 and 25, although other connection media can be used. Thus, node emulator 10 need include only two bi-directional ports coupled to links 24 and 25 to support the simple pass through configuration illustrated in FIG. 1.

Client 20 communicates to server 30 via node emulator 10 by, for example, issuing application transaction requests that are in turn transmitted in the form of data packets. Server 30 responds by issuing corresponding application transaction responses. The traffic passing to and/or from client 20 and server 30 via node emulator 10 is herein referred to as "foreground traffic." Node emulator 10 internally simulates the generation of other contending traffic sources, herein referred to as "background traffic," to determine the performance impact of the background traffic on the foreground traffic.

Foreground traffic can be generated, for example, by test software, such as Chariot™, which is a commercially available software application from NetIQ for generating application traffic. Thus, in the foregoing illustrative embodiment, test software such as Chariot™ would be installed in client 20 and would be generating traffic sent to server 30 via node emulator 10. In general, the foreground traffic can be generated by any pair of hosts running peer-to-peer (e.g., Voice-over-IP, gaming, etc.), client/server (e.g., web browsing, database query, FTP, etc.), or any other real application between two endpoints. Thus, foreground traffic consists of actual data packets generated in real time by client 20 and server 30, while simulated background traffic is generated internal to emulator 10 (as explained below).

Node emulator 10, physically similar to an actual node, can be configured in terms of bandwidth, port speed, queue size, queuing policy, etc., to model the egress port functionality of a node. Regarding control plane (e.g., signaling) and routing protocol support, the node emulator can be implemented as "transparent" or "protocol aware."

The node emulator 10 can be implemented as a "transparent" (i.e., protocol-unaware) device that simply forwards or discards packets (e.g., IP packets), frames (e.g., Ethernet, Frame Relay, POS frames), or cells (e.g., ATM cells) with no modification to any of the packet, frame, or cell headers. Only two ports of the same media type are supported in this mode (as depicted in FIG. 1).

Alternatively, the node emulator 10 can operate as a "protocol-aware" device that performs switching and/or routing control plane operations and associated packet, frame, or cell header translations. In this case, node emulator 10 appears as a fully operational switch or router to the adjoining client, server, or other real nodes. Node emulator 10 performs routing (e.g., for IP router emulation), signaling (e.g., for ATM switch emulation), and header field modifications in a manner identical to a real node between two ports (as depicted in FIG. 1). (Additional "real" ports can be added and emulated as desired, with a resultant increase in complexity.)

For instance, in the case of IP node emulation, node emulator 10 performs address resolution protocol (ARP) functions, constructs a routing table, performs the TTL decrement and check sum calculation, etc., for foreground traffic IP packets forwarded through the node represented by emulator 10. In this case, node emulator 10 is a fully functional, multi-port, switch or router having the additional capability of internally generating background traffic and subjecting incoming foreground traffic to queuing level impairments as a result of that background traffic. It should be noted that when functioning as "protocol-aware" IP router, emulator 10 further supports link-level media translations (e.g., IP-over-ATM ingress port to IP-over-Ethernet egress port) occurring between client 20 and server 30. A dedicated microprocessor can be included in emulator 10, as discussed below with respect to FIG. 3, to support the foregoing "protocol-aware" control functions.

When node emulator 10 is implemented in the "transparent" mode, operation differs depending on whether the node is emulating an IP node or a frame level node. When a packet layer (IP layer or other network or OSI layer 3) node (such as an IP router) is chosen to be emulated, emulator 10 performs IP (or other network layer) packet de-encapsulation (at ingress) and encapsulation (at egress) so that impairment operations (e.g., foreground packet discards and delays) can be performed at the IP packet level. If so, simplicity (of transparent mode) is maintained by encapsulating the packets to be forwarded (upon egress) in identical copies of the link layer frames in which those packets arrived.

Alternatively, if the node is "transparent" and emulating a frame level node, a frame is forwarded without de-encapsulation, encapsulation, or header modification. Other than this distinction in operation between transparent modes for packet layer nodes vs. frame layer nodes, there is no significant distinction in the "transparent" mode implementation in terms of its primary functions. For that reason, packet level operation is assumed unless specified otherwise, for the balance of this application, without loss of generality. That is, the data units traversing the emulator node will be referred to as data packets (which include cells, frames, or network layer packets). A "transparent" mode implementation is assumed unless specified otherwise for the balance of this application.

The type and volume of background traffic generated internal to node emulator 10 is also configurable. A graphical user interface (GUI) associated with node emulator 10 enables a user to configure the node emulator. Thus, depending on the configuration of the node and the background traffic, node emulator 10 will make a forwarding decision with respect to each foreground traffic data packet received from client 10 and server 30. The forwarding decisions include: forwarding the data packet, delaying and forwarding the data packet, or discarding the data packet. As such, the end-to-end (e.g., client to server) response time, throughput, delay, lost data, and other performance characteristics can be measured at client 10 and/or server 30. Moreover, some packet level statistics (e.g., packet delay, packet delay variation, packet loss) of the foreground data flow can be collected at the node emulator itself.

Figure 2:
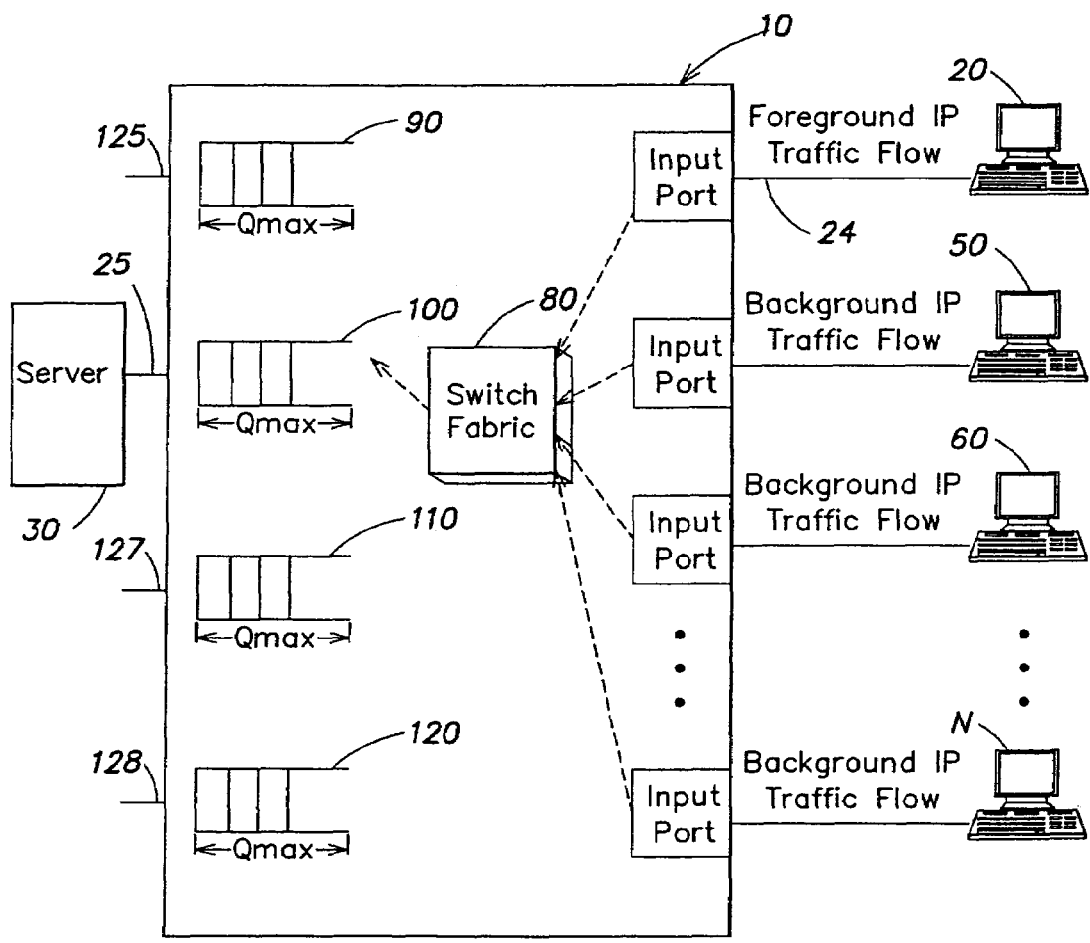
FIG. 2 is a schematic diagram illustrating node architecture modeled by the node emulator of FIG. 1.

Node emulator 10 models node level network impairments incurred by a foreground traffic flow to and from client 20 as if that foreground traffic flow were contending with other coincident background traffic. FIG. 2 illustrates an example of the multiplexing scenario modeled (or emulated) by node emulator 10.

In FIG. 2, only client 20 and sever 30 are true physical hardware, and links 24 and 25 are the only true physical links connecting client 20 and server 30 externally to node emulator 10. Emulator 10 internally models the aggregate effect of simulated background clients 50, 60, . . . N, simulated switch fabric 80, and simulated queues 90, 110, and 120 (with associated simulated links 125, 127, and 128) on foreground traffic to/from client 20 and server 30. As explained hereinafter, hardware or software operating on node emulator 10 is used to emulate the node level impairments resulting from multiple sources contending for the same port resources as illustrated in FIG. 2. Generally, hardware, firmware, or software implements an algorithm adapted to calculate, among other things, how long the foreground traffic should be delayed (to represent queuing of the foreground traffic into queue 100), or whether to discard the foreground traffic due to an overflow. Note that (for each direction) node emulator 10 only models one of the ports of a true node (each link 24 and 25 is connected to a physical port of node emulator 10).

In an actual node, switch fabric 80 depicted in FIG. 2 would normally provide some small additional delay (in addition to any queuing delays experienced by packets), and is modeled by providing some small additional fixed delay to all packets that are forwarded (i.e., not discarded) by node emulator 10. Since this delay is usually negligible relative to the queuing delays, it is not accounted for in the foregoing illustrative embodiment. However, if desired, the fixed delay is incorporated by adding a small additional constant value to the waiting time experienced by those packets that are forwarded through (i.e., not discarded) node emulator 10.

Figure 3:
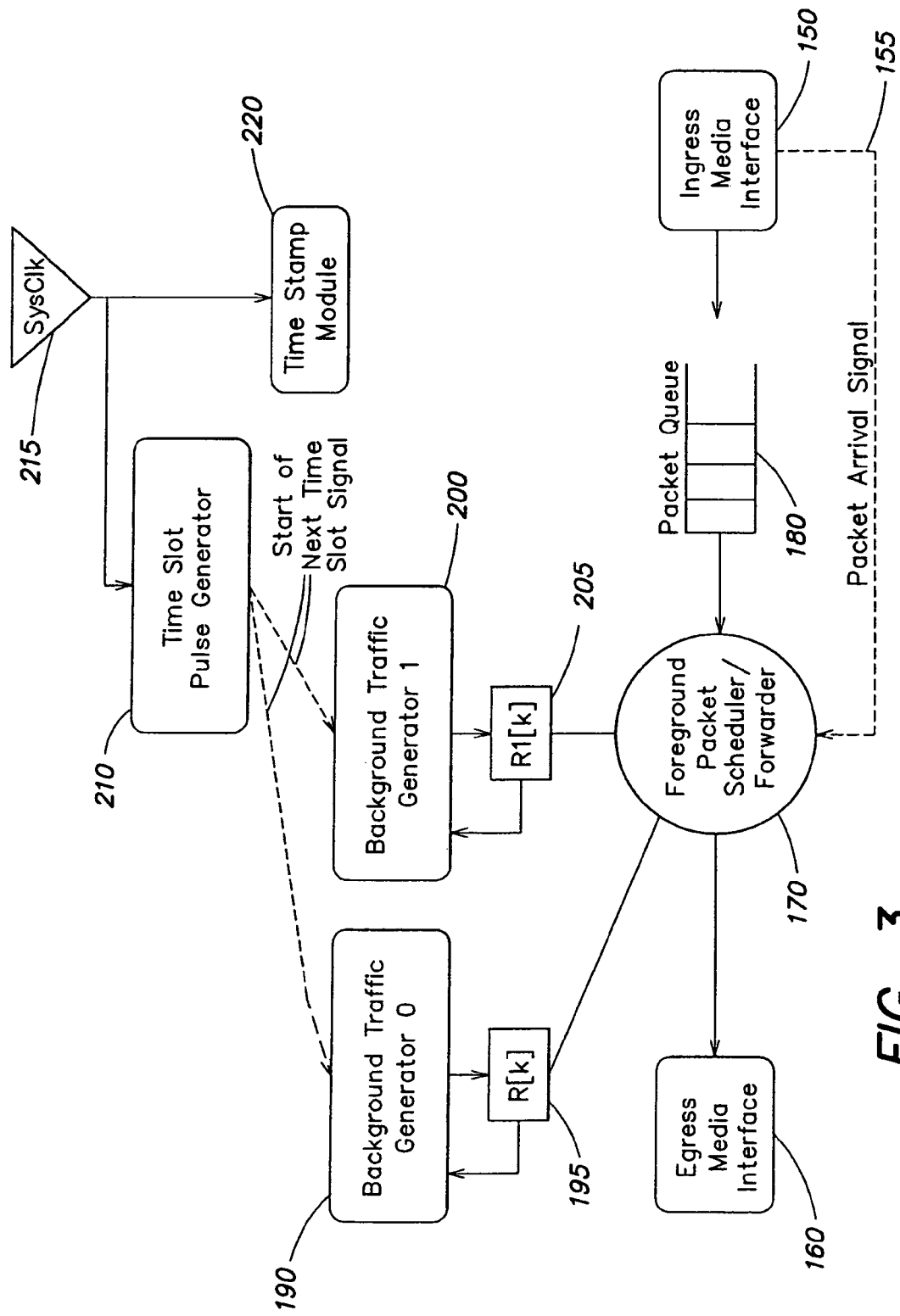
FIG. 3 is an architectural block diagram of the node emulator of FIG. 1.

FIG. 3 shows an architectural block diagram of node emulator 10 used to model traffic flow in one direction, e.g., from client 20 to server 30. The architecture of FIG. 3 is replicated (once for each direction) to support bi-directional operation as shown in FIG. 1. An ingress media interface 150 provides the physical media receiver and MAC layer functions used for interfacing the foreground traffic flow from client 20 to node emulator 10. That is, interface 150 provides physical and link layer termination for terminating the Layer 2 framing structure used to encapsulate the foreground traffic flow, according to the particular transport technology being utilized.

An egress media interface 160 provides link layer encapsulation and physical layer transmission functions analogous to ingress media interface 150. Thus, any commonly deployed LAN or WAN media (e.g., Ethernet, Frame Relay, ATM, POS, etc.) can be supported by node emulator 10. Although the foregoing illustrative embodiment utilizes Fast Ethernet, other possible interfaces, without limitation, include: Frame Relay/PPP transceiver and framing logic; ATM transceiver logic with AAL5 Segmentation and Reassembly (SAR); pure ATM cell processing without SAR, Packet over SONET (POS); and others. Thus, ingress and egress media interfaces 150 and 160 interface the particular transport technology being used with the queuing simulation functions performed by the node emulator 10 explained hereinafter.

A foreground packet scheduler forwarder (FPSF) 170 controls the transfer of an incoming foreground packet from ingress media interface 150 to a packet queue 180 to egress media interface 160. In the foregoing illustrative embodiment, the node emulator architecture includes background traffic generators 190 and 200, associated latches 195 and 205, a time slot pulse generator 210 (in this case a divide by r counter), a system clock 215, and a time stamp module 220.

FPSF 170 can be a hardware logic implementation (e.g., implemented in VHDL), a software application (e.g., written in C or C++), or a firmware application operating in node emulator 10, although the invention is not limited to any particular hardware, firmware, or software implementation or language. Generally, FPSF 170 performs computations to determine whether a foreground traffic data packet received at ingress media interface 150 from client 20 should be discarded (e.g., to model a queue overflow event), and, if the packet is not to be discarded, FPSF schedules a time at which the data packet is to be forwarded from the packet queue memory 180 to the egress media interface 160. The scheduled time is calculated to simulate the time in which the foreground data packet would be waiting in the particular queue modeled (e.g., queue 100) in FIG. 2.

When the scheduled time for forwarding is reached for a data packet, a forwarding process causes the data packet to be forwarded from packet queue 180 to egress media interface 160, which in turn encapsulates the contents of the data packet in a frame structure according to the particular media being used (e.g., Fast Ethernet in FIG. 1), performs the appropriate header field modifications (e.g., TTL decrement for IP), and transmits the packet onto link 25. The time in which the data packet waits in packet queue 180 for its scheduled forwarding time is referred to as the waiting time for that particular data packet. The sample distribution (e.g., histogram) and average value of waiting times represent examples of statistics that can be monitored and logged by the node emulator.

Thus, the primary functions of FPSF 170 are first to make a packet discard decision and then, if the packet is not discarded, to compute a waiting time for each arriving foreground traffic data packet during which the data packet remains in queue 180. The waiting time for a given data packet is a function of the queuing policy being simulated (which can be selected by a user via a GUI). According to the foregoing illustrative embodiment, one of two queuing policies can be selected (1) FIFO or (2) Static Priority, although other queuing policies can be implemented (e.g., WFQ). Generally, as discussed in detail below, when the Static Priority queuing policy is selected, node emulator 10 can also be configured to internally model background traffic having higher priority than the foreground traffic generated by client 20, thereby emulating the effect that such traffic would have on the foreground traffic.

Figure 4A:
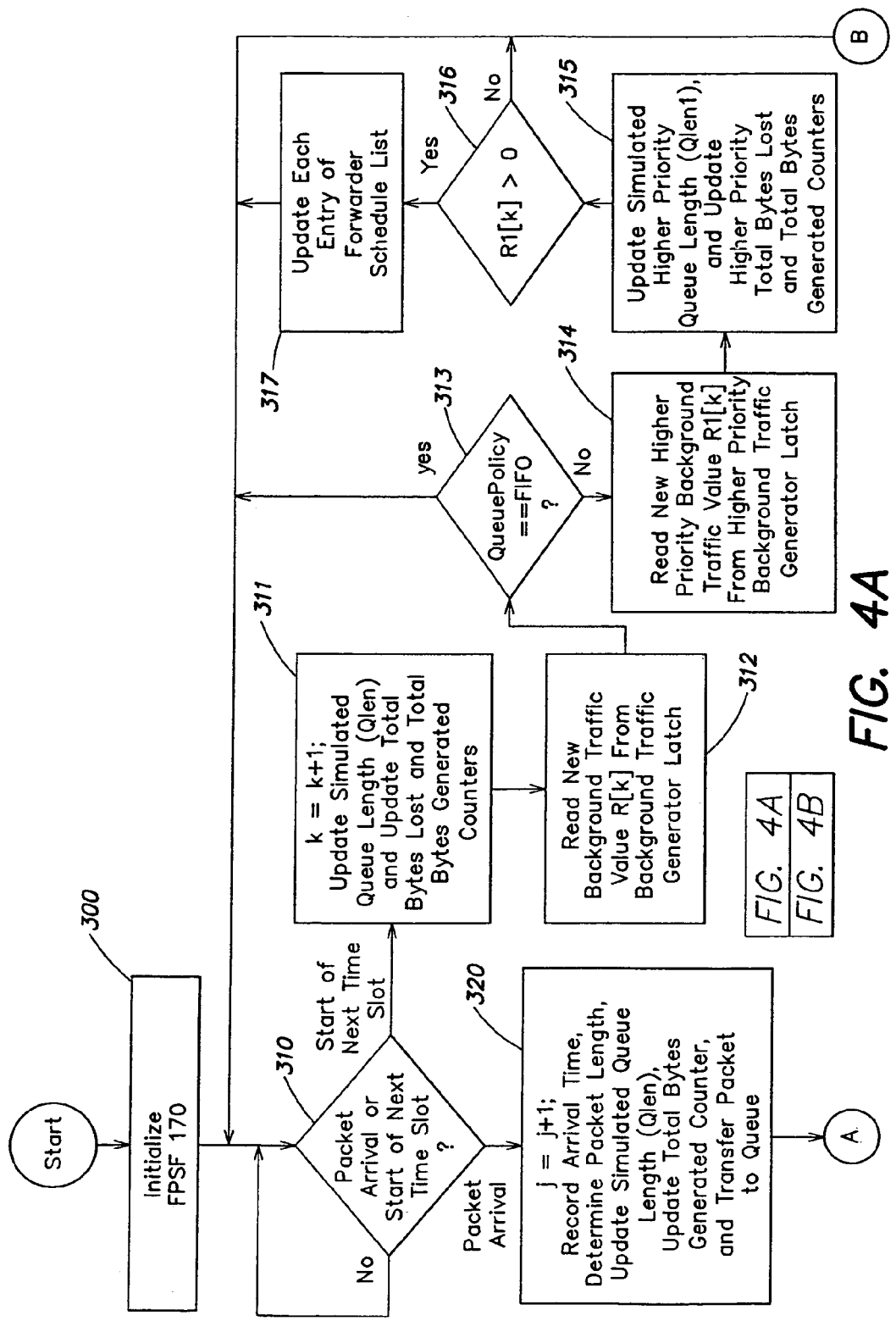
FIGS. 4A and 4B are a flow chart of the scheduler process performed by the node emulator of FIG. 1.
Figure 4B:
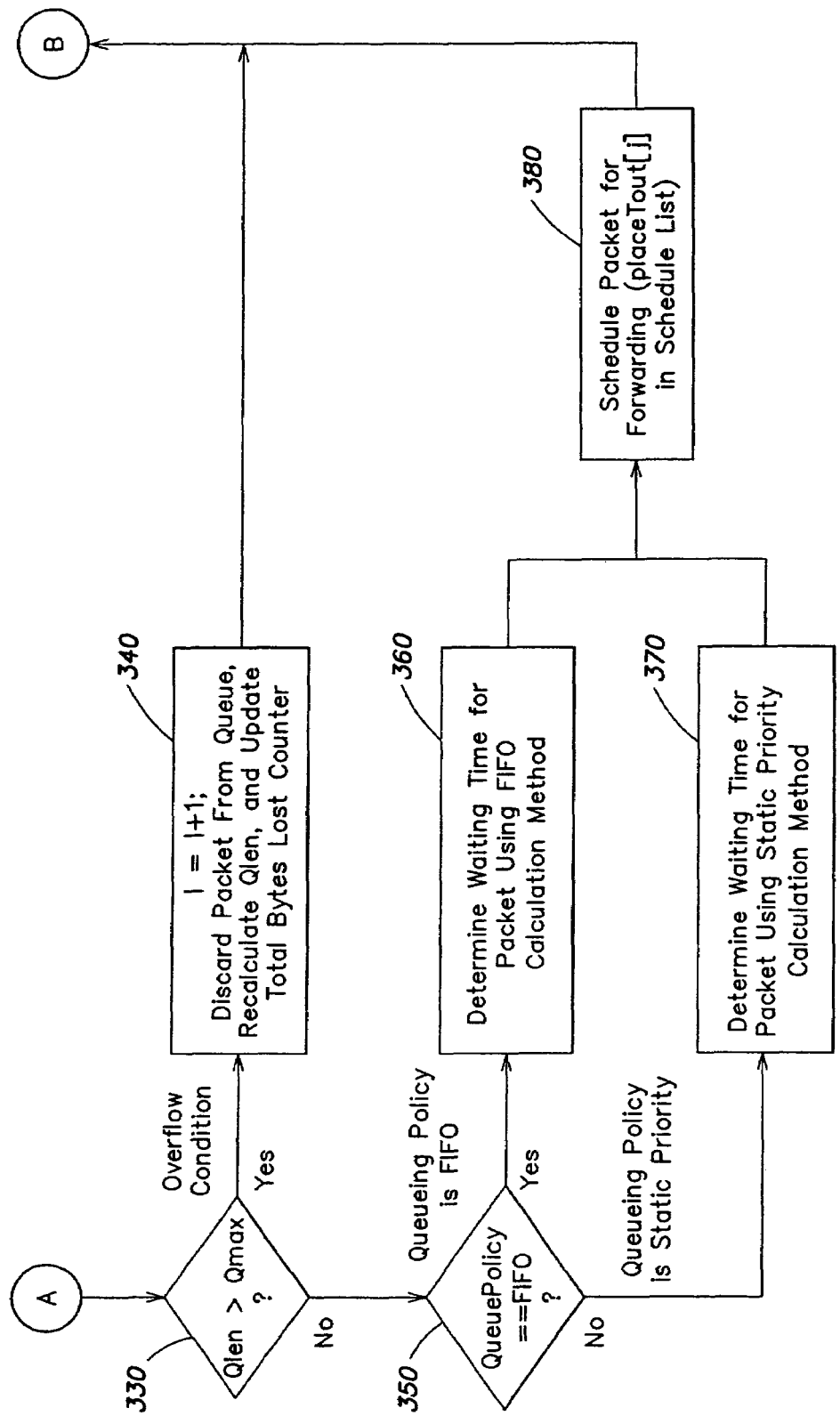

FIGS. 4A and 4B show a flow diagram illustrating the scheduling process executed by FPFS 170. The following variables and functions are used herein to facilitate an understanding of the computations executed by FPFS 170 in accordance with the foregoing illustrative embodiment:

j=packet index incremented upon arrival of each data packet;

pktlen[j]=size of the jth packet (in bytes);

Tin[j]=arrival time of the jth arriving packet (in seconds) as captured by the timestamp module;

Tout[j]=time scheduled for the jth packet to be forwarded to egress media interface 160;

W[j]=waiting time for the jth packet to be forwarded to the egress media interface (in seconds);

k=time slot index incremented at the beginning of each time slot;

T0=length of each time slot (in seconds);

Tslot[k]=time at the beginning of the kth time slot as captured by the timestamp module. Theoretically, Tslot[k]=k*T0 and thus should always approximate that value;

R[k]=background traffic volume (in bytes per second) generated during the kth time slot;

R1[k]=volume of high priority background traffic generated during the kth time slot (bytes per second);

Qlen=occupancy of the simulated queue. In general, Qlen is updated immediately following either a "packet arrival" event or "beginning of time slot" event. All foreground packets flow through this queue;

Qlen1=occupancy of the simulated higher priority queue (when static priority queuing is selected). This variable is not used when FIFO queuing is selected. Note that only simulated high priority background traffic effects this queue; foreground traffic does not flow through this queue;

last_event_time=temporary variable used in Qlen update calculations. It represents the time of the last event (either a "packet arrival" or "beginning of timeslot" event) prior to the time this variable is calculated;

temp_Qlen=temporary variable used in Qlen update calculations;

temp_Qlen1=temporary variable used in Qlen1 update calculations;

d=additional waiting time delay caused by additional high priority traffic that arrives before the packets current waiting time expires (i.e. accounts for pre-emptive effect of higher priority traffic in when Static Priority queuing is selected).

C=output (or egress) link capacity being simulated by the node 10 (FIG. 1) (in bits per second). Note that C may be selected to be a value less than the actual egress port capacity of the node emulator to model a lower speed link. The default value is the bit rate capacity of the egress port so a Fast Ethernet port, for instance, would have a default value of 100 Mb/s (though C could be provisioned to a lower value);

a[k]=rate of growth of the simulated queue occupancy (in bytes per second) for the duration of the kth timeslot. Thus, a[k] is the rate of growth (or derivative) of Qlen during time period Tslot[k]≦t≦Tslot[k+1];

a1[k]=Rate of growth of the simulated high priority queue occupancy (in bytes per second) for the duration of the kth timeslot when Static Priority queuing is in effect, i.e., a1[k] is the rate of growth of Qlen1 during the time period Tslot[k]<t<Tslot[k+1];

Qmax=maximum capacity of the simulated queue. A packet arrival that would cause Qlen to exceed Qmax is discarded;

Qmax1=maximum capacity of the simulated high priority queue. Thus, Qlen1 is upper bounded by this value;

l=cumulative count of discarded packets. This can be used to calculate the foreground packet loss ratio according to l/j;

Tot_bytes_gen=cumulative count of the total bytes generated by the lower priority background traffic generator plus total number of bytes resulting from all foreground packets that have arrived;

Tot_bytes_gen1=cumulative count of the total bytes generated by the higher priority background traffic generator;

Tot_bytes_lost=cumulative count of total lower priority bytes lost (includes lost bytes from lower priority background generator and cumulative total bytes of discarded foreground packets); and Tot_bytes_lost1=cumulative count of total higher priority bytes lost (includes lost bytes from higher priority background generator)

In step 300 of FIG. 4A, FPSF 170 initializes the system in which j=k=l=0;

Tot_bytes_gen=Tot_bytes_lost=0;
Tot_bytes_gen1=Tot_bytes_lost1=0;
Tin[0]=Tout[0]=R[0]=R1[0]=W[0]=0; and
Qlen=Qlen1=0.

FPSF 170 (FIG. 3) detects either the arrival of a data packet at ingress media interface 150 via packet arrival signal 155 from ingress media interface, or a beginning of time slot signal from timeslot generator 210 (step 310). Upon receipt of the packet arrival signal, in step 320, FPSF 170 performs the following functions: packet counter j is incremented, the arrival time of packet j is recorded (Tin[j]=Tstamp(pkt[j])), the packet length (in bytes) is determined (pklen[j]=get_pktlen(pkt[j])), the simulated (lower priority) queue length (Qlen) is updated (detailed below), the total bytes received counter (Tot_bytes_gen) is updated (detailed below), and the packet is transferred from ingress media interface 150 to queue 180. Time stamp module 220 (FIG. 3) is used to timestamp the arrival of each packet and timestamp the beginning of each time slot, which are denoted as Tin[j] and Tslot[k], respectively.

The simulated queue length calculation (in step 320) and Tot_bytes_gen counter update, are performed as follows. Assuming that the jth packet arrival occurs during time slot k, i.e., Tslot[k] is less than Tin[j] and Tin[j] is less than Tslot[k+1], the simulated queue length immediately after the jth packet arrives can be calculated using the relation:

temp_Qlen=Qlen+pktlen[j]+a[k]*(Tin[j]−last_event_time)/T0,

Qlen=Max(temp_Qlen,0);

where last_event_time=Max(Tin[j−1], Tslot[k]), and a[k]=R[k]−(1/8)*C (bytes/sec).

and Tot_bytes_gen counter is updated according to

Tot_bytes_gen=Tot_bytes_gen+*pktlen[j]*;

As seen from the foregoing relation, the length of the simulated queue immediately after receiving the jth packet is calculated by taking into account: the simulated queue length prior to receiving the arriving packet, the rate of growth of the queue during the timeslot the packet arrived in (a[k]), the packet length of the arriving packet (pktlen[j]), and the time of the last event prior to the packet arrival (denoted by last_event_time). The rate of growth of the simulated queue, a[k], during timeslot "k" depends on the current value of the sequence R[k] generated by background traffic generator 190.

The function Max(x, y) is defined as the greater of x and y and is used in the above equation to ensure that Qlen has a nonnegative value, since a[k] (the rate of growth of the simulated queue) can have a negative value (and consequently, temp_Qlen can be negative), but the queue occupancy (Qlen) cannot. This can occur when the background traffic rate sequence R[k] is less than the node's simulated link capacity (1/8)*C, resulting in the rate of growth of the simulated queue, a[k], having a negative value indicating a decreasing rate of growth of queue size during the kth time slot.

The temporary variable last_event_time=Max(Tin[j−1], Tslot[k]) is used in the above equation to specify the time of the last event prior to the jth packet arrival. Note that the term "event" applies to either a "packet arrival" or "beginning of timeslot" event. Since it is assumed that the jth packet arrival occurs within the kth timeslot, the last event just prior to that arrival must be either the beginning of the kth time slot (with timestamp Tslot[k]), or the (j−1)th packet arrival (having timestamp Tin[j−1]). The timestamp of the event which occurred the latest amongst those two possibilities is of course Max(Tin[j−1], Tslot[k]).

It should be noted that the simulation becomes less accurate when T0 (length of the time slot k) is chosen too large because the approximation of the actual queue dynamics becomes more coarse as T0 is increased. This is explained by the fact that the background traffic generator only models the background traffic dynamics at intervals of T0 and only approximates (i.e., interpolates) that behavior at times within these intervals according to the linear rate of growth function, a[k]. On the other hand, the computation burden is increased as T0 decreases due to more frequent changing of the background traffic rate R[k]. Thus, there is a design tradeoff in the selection of T0. A preferred design rule of thumb is to select T0 such that Max(a[k]*T0) is only a fraction of, typically on the order of one-half or less, Qmax, the maximum occupancy of the simulated queue before overflow. Note that Max(a[k]*T0) represents that maximum change in occupancy of the simulated queue during any given timeslot. As such, T0 can be selected fairly easily if one knows the upper bound on R[k] (which in turn would bound a[k]), otherwise, T0 can be estimated on the basis of some knowledge of the background traffic behavior.

To account for a possible overflow of the simulated queue, the simulated queue length (Qlen) calculated in step 320 is compared, in step 330, to the maximum occupancy of the simulated queue (Qmax). If the calculated simulated queue length is greater than the maximum occupancy of the simulated queue (Qmax), an overflow condition is present, and, in step 340, the packet is discarded (e.g., removed from the queue 180 via pointer manipulation, or, alternatively, overwritten upon the next packet arrival), the packet loss counter I is incremented by one, i.e. I=I+1, the total bytes lost statistic variable (Tot_bytes_lost) is incremented by the byte length of the discarded packet (Tot_bytes_lost=Tot_bytes_lost+pktlen [j]), and the queue length is recalculated by subtracting the length of the discarded packet from the queue length (Qlen=Qlen−pktlen[j]). The process then returns to 310 to wait for the occurrence of the next "packet arrival" or "start of next timeslot" event.

If an overflow condition is not encountered in step 330, then the packet is not discarded and the waiting time for the data packet to be forwarded to egress media interface 160 is computed. The waiting time (W[j]) simulates the time that the jth arriving data packet from client 20 would wait in queue 100 of FIG. 2. Note that if the jth arriving packet encounters an overflow condition, then W[j] is not calculated for that packet since it will be discarded in step 340. In the foregoing illustrative embodiment, FPSF 170 uses one of two different waiting time calculation methods depending on whether node emulator 10 is configured for a FIFO or Static Priority queue policy (step 350).

If the node emulator is configured to model a FIFO queuing policy, then, in step 360, the waiting time for the packet is calculated by the relation:

$$W[j]=(Qlen*8)/C$$

which takes into account the current simulated queue occupancy (Qlen) and the link capacity (C) of the emulated node.

If node emulator 10 is configured to model a Static Priority queuing policy, then in step 370, the waiting time for the packet is calculated by $$W[j]=(Qlen+Qlen1)*(8)/C$$

When node emulator is configured for Static Priority queuing, Qlen represents the length (or occupancy) of the lower priority queue (which includes the foreground traffic from client 20), and Qlen1 represents the length of the high priority queue. Therefore, the above relation takes into account both the lower priority queue occupancy (Qlen), higher priority queue occupancy (Qlen1), and the link capacity (C) of the node.

In step 380, after performing the waiting time calculation, in step 360 or 370, the packet is then scheduled to be forwarded to the egress media interface 160 by FPSF 170 by summing the waiting time W[j] calculated in step 360 or 370 with the time the packet was received (Tout[j]=Tin[j]+W[j]). Tout[j] is then placed on a forwarding "schedule list" (to be subsequently read by the FPSF 170 when time Tout[j] is reached (see FIG. 5). Thus, FPSF 170 calculates the waiting time for each incoming packet from client 20, which is intended to reflect the actual waiting time the data packet would encounter if the client was connected to an actual networked node.

After the current data packet is either discarded (step 340), or scheduled for forwarding (step 380), the process repeats by returning to 310.

If, in step 310, a Start of Next Time Slot is detected by FPSF 170 (as opposed to a packet arrival), then, in step 311, first the timeslot counter "k" is incremented by one, and the simulated queue length (Qlen) is updated according to:

temp_*Qlen*=Max (*Qlen*+*a*[*k*−1]*(*T*slot[*k*]−last_event-_time)/*T*0,0),

*Qlen*=Min(temp_*Qlen,Q*max), where last_event_time=Max(Tin[j], Tslot[k−1]), and a[k−1]=R[k−1]−(1/8)*C (bytes/sec), and the total bytes generated (Tot_bytes_gen) and total bytes lost (Tot_bytes_lost) counters are updated according to:

Tot_bytes_gen=Tot_bytes_gen+*R[k−1]*T0,

Tot_bytes_lost=Tot_bytes_lost+Max(temp_*Q*len−
*Q*max,0).

In step 312, the new background traffic volume sequence value R[k] (bytes/sec) for the updated timeslot index value "k" is read from latch 195.

The above Qlen update calculation in step 311 is performed upon a "start of next timeslot" event indication signal (from timeslot pulse generator 210, FIG. 3). Since the last packet arrival occurred at time Tin[j] (based on the current value of index j at the time the "beginning of timeslot" event occurred), the last event time occurred at either time Tslot[k−1] or time Tin[j], whichever of these happened latest, i.e., last_event_time=Max(Tin[j], Tslot[k−1]). Also, since the timeslot index "k" is incremented by one at the beginning of step 311, a[k−1] is used as the rate of growth for Qlen between the last_event_time and time Tslot[k] to calculate the final occupancy of the simulated queue at the end of previous timeslot (which is equivalent to the occupancy upon the occurrence of the current "start of next timeslot" event).

After step 312, if node emulator 10 is configured to provide FIFO queuing (as determined in decision step 313), then FPFS 170 (FIG. 3) returns to step 310 and waits for the next event. If the node emulator is configured to provide Static Priority queuing, FPSF 170 reads the high priority traffic volume sequence value, R1[k](bytes/sec), from high priority background traffic generator latch 205 (step 314), using the updated timeslot index "k" (updated in step 311).

R1[k], in step 315, is then used by FPSF 170 to update the high priority simulated queue occupancy (Qlen1), according to:

temp_*Q*len1=*Q*len1+Max(a1*[k]*T0,0), and

*Q*len1=Min(temp_*Q*len1,*Q*max1);

where
a1[k]=R1[k]−(1/8)*C (bytes/sec), and the high priority total bytes generated and lost counters (Tot_bytes_gen1 and Tot_bytes_lost1) are updated as follows:

Tot_bytes_gen1=Tot_bytes_gen1+*R1[k]*T0; and

Tot_bytes_lost1=Tot_bytes_lost1+Max(temp_*Q*len1−
*Q*max1,0).

If the value of R1[k] read from higher priority background traffic generator latch 205 (in step 314) is greater than zero (as determined in decision step 316), then the an additional delay d=(*R1[k]*T0*8)/C, is added to all scheduled times Tout[j] currently on the forwarding "schedule list" (from step 380) in step 317 (otherwise the flow returns to step 310). That is, Tout[j]=Tout[j]+d, for all Tout[j] currently in the "schedule list."

Figure 5:
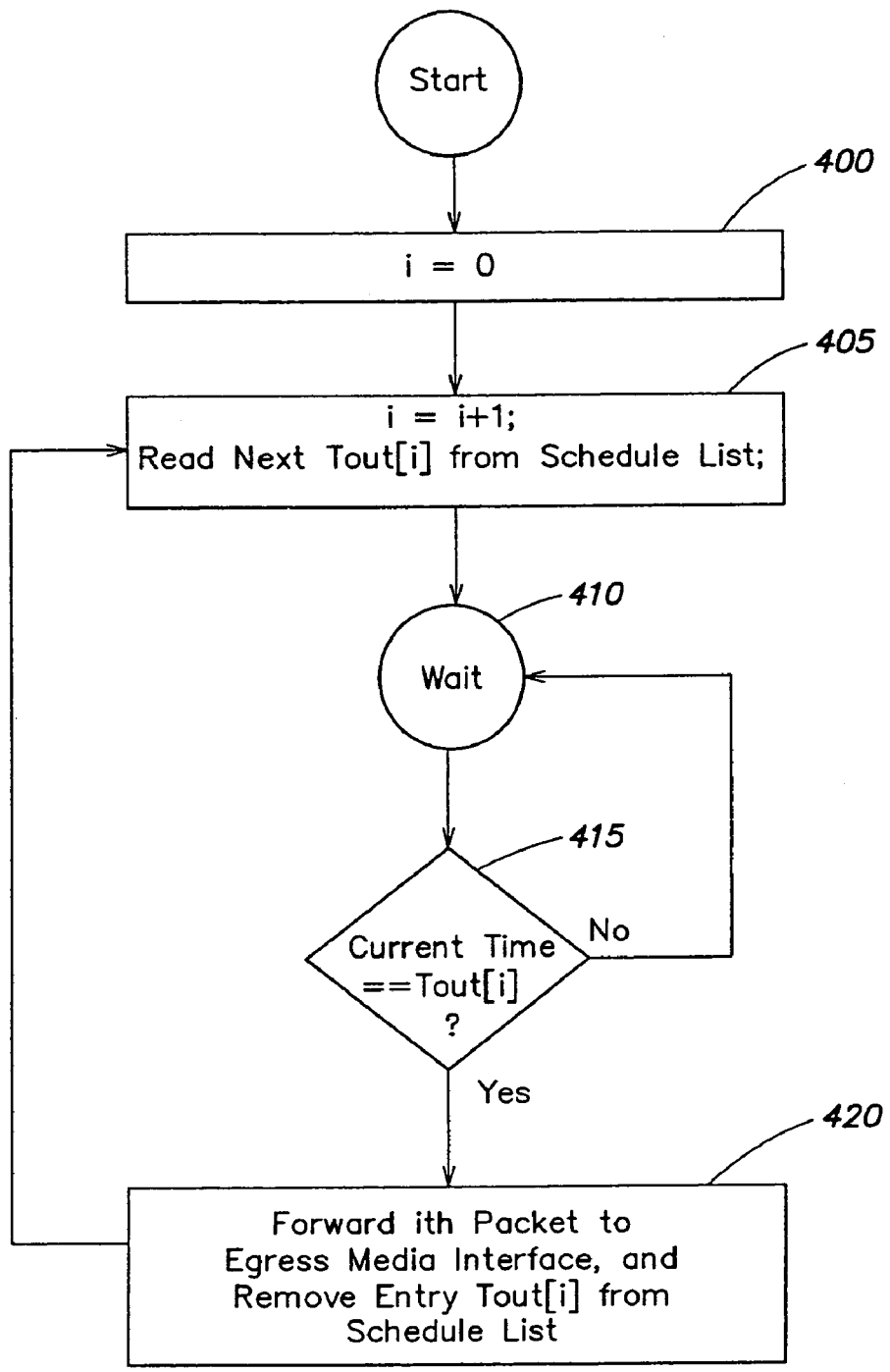
FIG. 5 is a flow chart of the forwarding process performed by the node emulator of FIG. 1.

The "schedule list" contains all scheduled forwarding times, Tout[j], previously placed in the list (via step 380), that have yet to be removed from the list by the forwarding process (step 420 of FIG. 5).

The purpose of adding the additional delay, d, is a consequence of the fact that the higher priority traffic pre-empts lower priority traffic and hence the scheduled time to forward a foreground traffic data packet (computed in step 370), becomes invalid if additional high priority traffic were to arrive before the scheduled forwarding time (Tout[j]) for that packet is reached.

The forwarding process executed by FPFS 170 (FIG. 3) is represented in flowchart form in FIG. 5. A data packet in queue 180 is forwarded to egress media interface 160 when the waiting time for that packet has expired, i.e., when time Tout[j] occurs. Note that while index "j" is used by the FPSF scheduling process (FIGS. 4A and 4B), to reference the schedule times (Tout[j]) placed in the schedule list in step 360, and to align those schedule times with the packet arrival index j, a different (and independent) index "i" is used to by the forwarding process (FIG. 5) to reference the schedule times currently in the list. Counter "i" is set to zero in initialization step 400, and is incremented each time a packet is forwarded to egress media interface 160 (FIG. 3) as explained herein. The index "i" is used by the forwarding process to restore continuity in the index values for entries Tout[i] in the "schedule list". Continuity is lost for the scheduler process index "j," as any discarded packets will cause the "j" index to lose continuity for packets that are not discarded.

In step 405, the forwarding process performed by FPSF 170 consecutively reads scheduled forwarding times from the schedule list formed in step 360, and waits for the current time to equal the scheduled time (Tout[i]) for the next packet to be forwarded (steps 410-415). When the time equals Tout[i] the ith packet is forwarded to the egress media interface, and then entry Tout[i] is removed from the "schedule list" (step 420).

Since the schedule times are read from the "schedule list" in the same order in which they placed in that list (i.e., in a first-come-first-serve manner), we always are assured to have Tout[i]<Tout[i+1].

Figure 6:
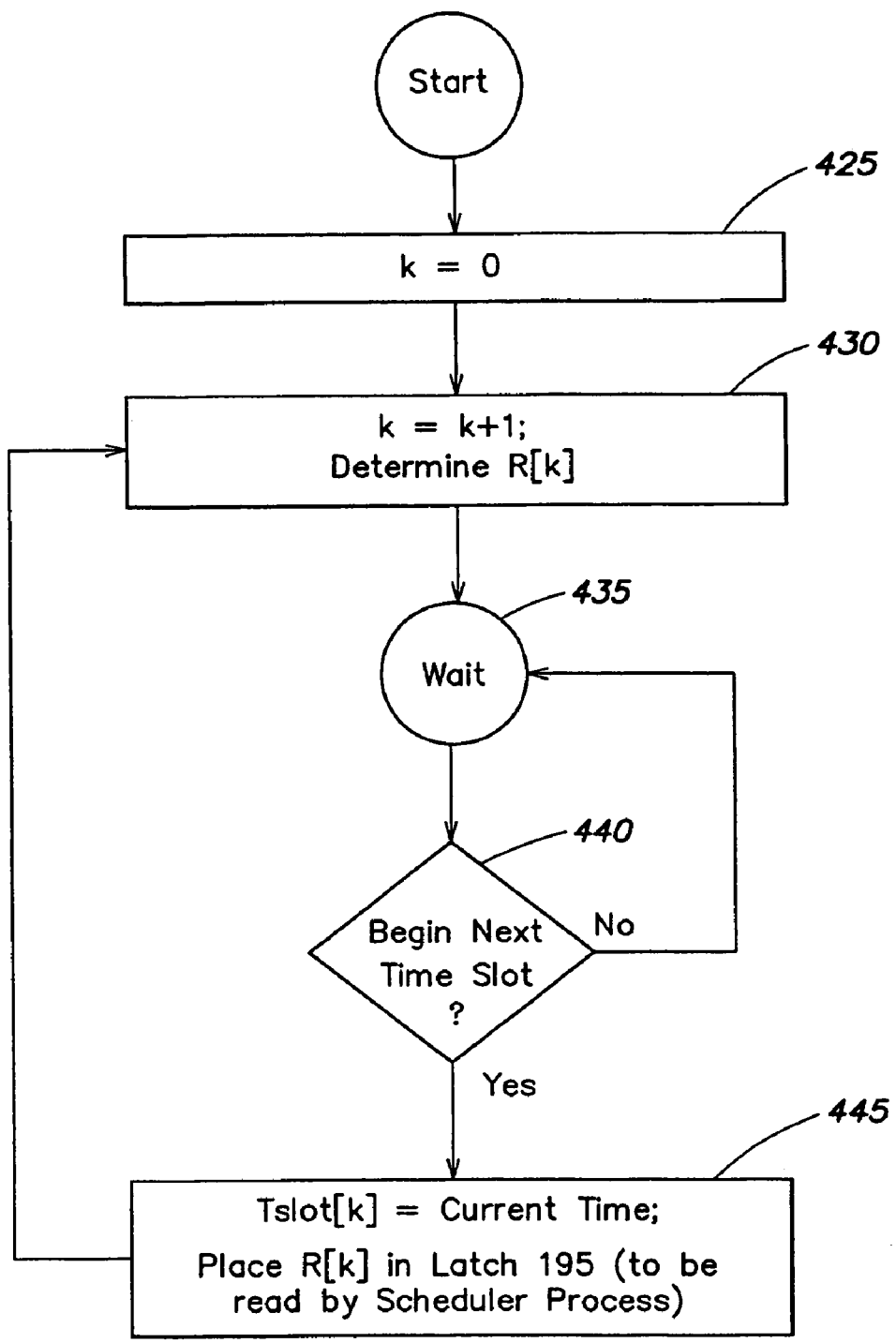
FIG. 6 is a flow chart of the background traffic generation process performed by the node emulator of FIG. 1.

Background traffic generator 190 updates the value of the background traffic sequence (R[k]) contained in latch 195 at the beginning of each time slot "k", in the manner indicated by the flow diagram of FIG. 6. After initialization (step 425), at the end of each time slot of length T0, a counter increments "k" and the next value of R[k] is determined using a serial random number generator, table lookup scheme, or other appropriate sequence generator (step 430). The process then waits T0 seconds for the next time slot to begin (steps 435-440). When the next time slot occurs, in step 445, background traffic generator 190 places the background traffic sequence determined in step 430 in latch 195 (which is subsequently read by FPSF 170 in step 312 as explained above). This process is repeated for each time slot.

Note that the value of the timeslot index "k" for each of FPSF 170 and background traffic generators 190 and 200 will differ (typically by 1 in an ideal case where both processes are initialized coincidentally), but this difference is inconsequential since the FPSF and background traffic generators operate independently (though synchronized to the same timeslot pulse generator 210 and signaled on timeslot events simultaneously). As can be observed in FIG. 6, "k" corresponding to the background generator process is immediately set to 1 after initialization in the background generator process (step 430), but "k" for the FPSP waits until the first timeslot event has occurred in the FPSP process (step 311, FIG. 4A).

Indexes "j" and "i" used above in describing the scheduling (FIG. 4) and forwarding (FIG. 5) processes, respectively, are incremented asynchronously with respect to each other. Index "j" is used to indicate the arrival of the jth packet at node emulator 10, and index "i" is used to indicate the ith packet to be forwarded through the node emulator. Index "k" which denotes the kth time slot for background traffic generation (FIG. 6), and also is used by the FPSF to index the kth timeslot event (FIG. 4), is independent with respect to these two processes, and independent and asynchronous with respect to indexes "i" and "j" as well. Thus each process independently increments its own corresponding index(es) as described above. The three processes (scheduling, forwarding, and background traffic generation) run concurrently and thus can be implemented via concurrent hardware state machines, software threads in a dedicated processor, or other appropriate means.

When node emulator 10 (FIG. 2) is configured to perform a Static Priority queuing policy, it simulates background traffic having higher priority than the foreground traffic generated by client 20, and thereby simulates the effect that such traffic would have on the foreground traffic. In the foregoing illustrative embodiment, an additional background traffic generator 200 (FIG. 3) is used generate a background traffic sequence having a higher priority than the foreground traffic.

Background traffic generator 200 generates high priority background traffic sequence R1[k] and places a new sequence value in latch 205 for each time slot "k" in a manner analogous to background traffic generator 190 explained above (FIG. 6). Both Background Generators are synchronized to the same time slot pulse generator 210. Thus, latches 195 and 205 are updated at the same time at the beginning of a new time slot k. However, they may, and typically would, have completely independent outcomes, thus the sequences R[k] and R1[k] are assumed to be independent. One can configure node emulator 10 to generate background traffic having the same priority as the foreground traffic and background traffic having a higher priority than the foreground traffic, to model the impact of higher priority traffic on the foreground traffic flow from client 20.

The flow diagram of FIG. 6 also applies to background generator 200 with the exception that in step 445, the outcome sequence is denoted by R1[k], and is placed in latch 205 (instead of latch 195).

Node emulator 10 (FIG. 2) enables a determination of the real-time effect of simulated background traffic on actual foreground traffic data packets generated by client 20. The node emulator mimics the packet loss and delay effects on a foreground traffic flow that traverses a single node subject to a quantifiable background traffic load—where the background traffic load is modeled by a periodic sequence of rate update events.

According to one illustrative embodiment disclosed herein, rather than modeling each background packet explicitly, a sequence of background traffic rates, R[k] (in bytes per second), per time interval T0 (seconds), is used to approximate the dynamically varying volume of background traffic. The background traffic sequence is updated after each time slot interval where "k" is the index of the kth time interval. The sequence R[k] is generated internal to the system independent of the foreground traffic packet arrival times and is used to approximate the actual background traffic process according to a fluid approximation, i.e., a steady rate R[k] during the kth time slot. This fluid analogy background traffic modeling approach mitigates the amount of total computations required for modeling a highly utilized switch or router port, as delay or discard computations are only performed for each foreground traffic packet.

The particular background traffic model to be used is user configurable, and can be generated internally via a pseudo random number generator, table lookup per time slot, or other suitable methodology. By use of table lookup, the background traffic process can be pre-computed offline and downloaded to the node emulator to provide a predetermined sequence of R[k] values to be read from memory for each time slot. Thus, any background traffic process can be applied that can be represented in terms of the number of bytes that arrive over a time interval of length T0. Some examples are Poisson distribution, Gaussian distribution, and Self-Similar (fractal) distribution models.

The illustrative embodiment of the node emulator 10 discussed above with reference to FIGS. 3-5 can be used, for example, to emulate FIFO or static priority queuing policies. Another type of queuing policy that can be emulated is Weighted Fair Queuing (WFQ), the use of which has increased as network equipment vendors have evolved product offerings with Class of Service (CoS) distinctions and Quality of Service (QoS) functionalities required for next generation data service offerings.

Using a FIFO queuing policy, packets are serviced in the same order as they are received. It has the primary benefit of ease of implementation and is prevalent in networking routers and switches as at least a default option. Using static priority, higher priority packets are always serviced before lower priority packets. In a WFQ policy, bandwidth resources are shared in a manner proportional to a set of weights assigned a priori, to a corresponding set of two or more queues. WFQ attempts to approximate the General Processor sharing (GPS) idealization that realizes min-max weighted fairness. Several variants of GPS approximation algorithms exist, such as WFQ, Weighted Round Robin, Deficit Weighted Round Robin, and others, all of which are herein referred to under the umbrella of WFQ.

In accordance with an illustrative embodiment described with reference to FIGS. 7-8, node emulator 10 emulates the performance impact of network traffic on packets that traverse nodes that implement a form of WFQ. As in previous embodiments, background traffic load is simulated internal to the node emulator 10, and made to contend with foreground packets, received by the node emulator 10.

Figure 7:
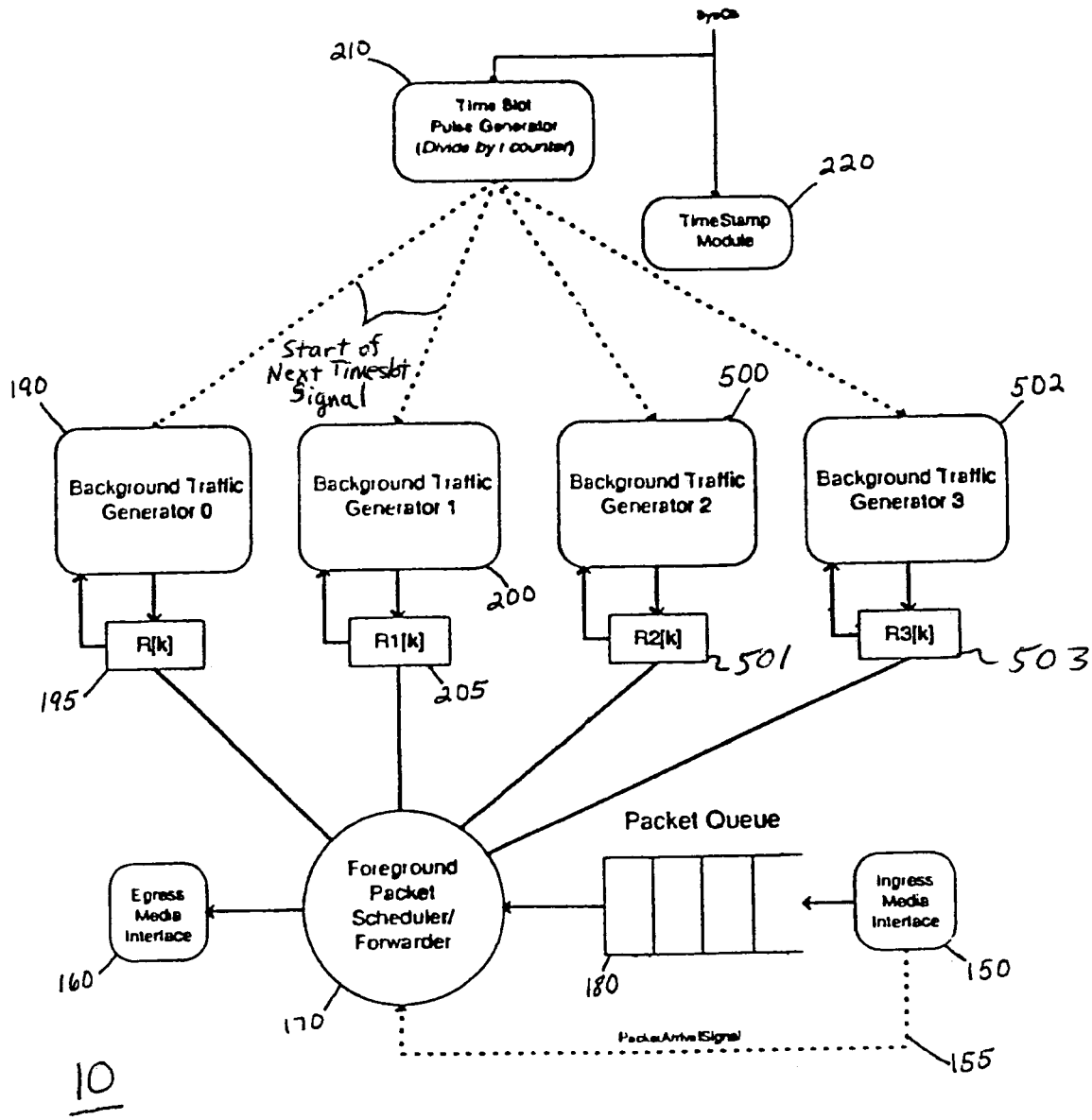
FIG. 7 is an architectural block diagram of the node emulator in accordance with an alternate embodiment in which a WFQ policy is emulated.

As shown in FIG. 7, the architecture of the emulator 10 is slightly different from FIG. 3, which was used in the FIFO and static priority policy examples. Additional background traffic generators 500 and 502, with associated latches 501 and 503, are present to emulate a node that implements WFQ having four service classes. WFQ having more or fewer service classes could be emulated by adding or taking away background traffic generators. The background traffic generators 190, 200, 500, and 502 compete with one another, and the foreground traffic packets (which share the same simulated queue (Qlen) as background traffic generator 190), for use of the same egress media interface 160 and egress port. It should be noted that using some or all of the architecture of FIG. 7, node emulator 10 could thus emulate all three queuing policies (FIFO, static, WFQ) mentioned herein.

Figure 8:
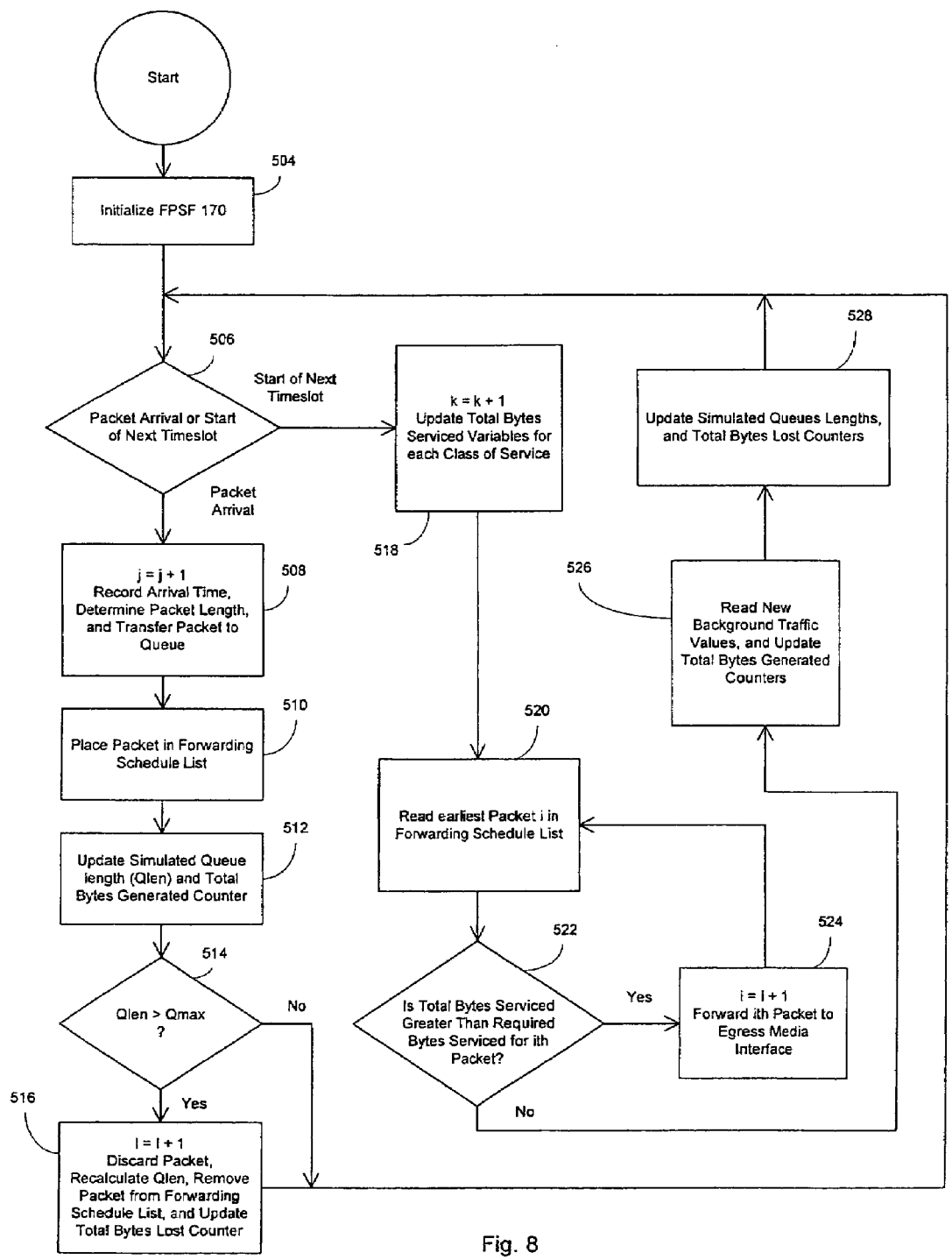
FIG. 8 is a flow chart of the forwarding process performed by the node emulator when emulating a WFQ policy.

FIG. 8 shows an example of a scheduling process executed by FPSF 170 when implementing WFQ emulation. In addition to the variables defined above with reference to FIGS. 4A, 4B, 5, and 6, the following additional variables and functions are used in this illustrative embodiment:

Required_bytes_svc_tag[j]=indicates the cumulative number of bytes (see Tot_bytes_svc defined below) that must be serviced by the foreground packet queue (Qlen) since initialization before the jth packet can be forwarded by FPFS 170 to egress media interface 160;

R[k]=background traffic volume (in bytes per second) generated during the kth time slot (shares Qlen with the foreground packets);

R1[k]=volume of class of service 1 (CoS1) background traffic generated during the kth time slot (bytes per second);

R2[k]=volume of class of service 2 (CoS2) background traffic generated during the kth time slot (bytes per second);

R3[k]=volume of class of service 3 (CoS3) background traffic generated during the kth time slot (bytes per second);

Qlen=occupancy of the simulated queue. In general, Qlen is updated immediately following either a "packet arrival" event or "beginning of time slot" event. All foreground packets flow through this queue. Simulated background traffic R[k] also is serviced by this queue;

Qlen1=occupancy of the simulated CoS1 queue when WFQ emulation is selected; only simulated CoS1 background traffic affects this queue; foreground traffic does not flow through this queue;

Qlen2=occupancy of the simulated CoS2 queue when WFQ emulation is selected; only simulated CoS2 background traffic affects this queue; foreground traffic does not flow through this queue;

Qlen3=occupancy of the simulated CoS3 queue when WFQ emulation is selected; only simulated CoS3 background traffic affects this queue; foreground traffic does not flow through this queue;

a[k]=rate of growth of the simulated queue occupancy (in bytes per second) for the duration of the kth timeslot. Thus, a[k] is the rate of growth (or derivative) of Qlen during time period $Tslot[k] \leq t < Tslot[k+1]$;

a1[k]=rate of growth of the simulated class of service 1 (CoS1) queue occupancy (in bytes per second) for the duration of the kth timeslot when WFQ emulation is in effect, i.e., a1[k] is the rate of growth of Qlen1 during the time period $Tslot[k] \leq t < Tslot[k+1]$;

a2[k]=rate of growth of the simulated class of service 2 (CoS2) queue occupancy (in bytes per second) for the duration of the kth timeslot when WQF emulation is in effect, i.e., a2[k] is the rate of growth of Qlen2 during the time period $Tslot[k] \leq t < Tsot[k+1]$;

a3[k]=rate of growth of the simulated class of service 3 (CoS3) queue occupancy (in bytes per second) for the duration of the kth timeslot when WFQ emulation is in effect, i.e., a3[k] is the rate of growth of Qlen3 during the time period $Tslot[k] \leq t < Tslot[k+1]$;

w=weight assigned to the foreground traffic and background traffic generated by R[k] (with current occupancy denoted by Qlen). Used to specify relative proportion of available bandwidth capacity to be allocated to the foreground traffic queue amongst all active service classes (i.e., with non-empty queue lengths) during a given timeslot;

w1=weight assigned to the CoS1 queue (with current occupancy denoted by Qlen1). Used to specify relative proportion of available bandwidth capacity to be allocated to the CoS1 traffic queue amongst all active service classes (i.e., with non-empty queue lengths) during a given timeslot;

w2=weight assigned to the CoS2 queue (with current occupancy denoted by Qlen2). Used to specify relative proportion of available bandwidth capacity to be allocated to the CoS2 traffic queue amongst all active service classes (i.e., with non-empty queue lengths) during a given timeslot;

w3=weight assigned to the CoS3 queue (with current occupancy denoted by Qlen3). Used to specify relative proportion of available bandwidth capacity to be allocated to the CoS3 traffic queue amongst all active service classes (i.e., with non-empty queue lengths) during a given timeslot;

y[k]=indicates whether Qlen is empty or non-empty during timeslot k. Set to 1 when Qlen is greater than zero at the beginning of time slot k, and set to 0 when Qlen is zero at the beginning of timeslot k;

y1[k]=indicates whether Qlen1 is empty or non-empty during timeslot k. Set to 1 when Qlen1 is greater than zero at the beginning of time slot k, and set to 0 when Qlen1 is zero at the beginning of timeslot k;

y2[k]=indicates whether Qlen2 is empty or non-empty during timeslot k. Set to 1 when Qlen2 is greater than zero at the beginning of time slot k, and set to 0 when Qlen2 is zero at the beginning of timeslot k;

y3[k]=indicates whether Qlen3 is empty or non-empty during timeslot k. Set to 1 when Qlen3 is greater than zero at the beginning of time slot k, and set to 0 when Qlen3 is zero at the beginning of timeslot k;

Qmax=maximum capacity of the foreground traffic queue Qlen. A packet arrival that would cause Qlen to exceed Qmax is discarded;

Qmax1=maximum capacity of the simulated CoS1 queue. Thus, Qlen1 is upper bounded by this value;

Qmax2=maximum capacity of the simulated CoS2 queue. Thus, Qlen2 is upper bounded by this value;

Qmax3=maximum capacity of the simulated CoS3 queue. Thus, Qlen3 is upper bounded by this value;

l=cumulative count of discarded packets. This can be used to calculate the foreground packet loss ratio according to l/j;

Tot_bytes_gen=cumulative count of the total bytes generated by the foreground traffic queue's background traffic generator plus total number of bytes resulting from all foreground packets that have arrived;

Tot_bytes_gen1=cumulative count of the total bytes generated by the CoS1 background traffic generator;

Tot_bytes_gen2=cumulative count of the total bytes generated by the CoS2 background traffic generator;

Tot_bytes_gen3=cumulative count of the total bytes generated by the CoS3 background traffic generator;

Tot_bytes_lost=cumulative count of total bytes lost from the foreground traffic queue Qlen (includes lost bytes from foreground traffic queue's background generator R[k] and cumulative total bytes of discarded foreground packets);

Tot_bytes_lost1=cumulative count of CoS1 bytes lost;
Tot_bytes_lost2=cumulative count of CoS2 bytes lost;
Tot_byteslost3=cumulative count of CoS3 bytes lost;
Tot_bytes_svc=cumulative count of the total number of bytes serviced (i.e., simulated as if they were forwarded) by the foreground traffic queue Qlen;

Tot_bytes_svc1=cumulative count of the total number of bytes serviced (i.e., simulated as if they were forwarded) by the CoS1 queue Qlen1;

Tot_bytes_svc2=cumulative count of the total number of bytes serviced (i.e., simulated as if they were forwarded) by the CoS2 queue Qlen2;

Tot_bytes_svc3=cumulative count of the total number of bytes serviced (i.e., simulated as if they were forwarded) by the CoS3 queue Qlen3;

Now referring to the process illustrated in FIG. 8, similar to step 300 of FIG. 4A, FPSF 170 is initialized in step 504, in which j=k=l=i=0
R[k]=R1[k]=R2[k]=R3[k]=0
Qlen=Qlen1=Qlen2=Qlen3=0
Tot_bytes_gen=Tot_bytes_lost=Tot_bytes_svc=0
Tot_bytes_gen1=Tot_bytes_lost1=Tot_bytes_svc1=0
Tot_bytes_gen2=Tot_bytes_lost2=Tot_bytes_svc2=0
Tot_bytes_gen3=Tot_bytes_lost3=Tot_bytes_svc3=0

FPSF 170 waits for either a foreground packet arrival or a start of a next time slot event to occur in step 506. If a foreground packet is received at ingress media interface 150, in step 508, FPSF 170 updates the packet arrival count j, records the packet arrival time Tin[j], determines the length of the arriving packet pktlen[j], and the packet is transferred to queue 180 (FIG. 7). In step 510, the variable Required_bytes_svc_tag[j] is set for the arriving packet as equal to the sum of the current values of the total bytes serviced variable and the simulated foreground packet queue length (Tot_bytes_svc+Qlen), and placed in a scheduler list. Thus, the Required_bytes_svc_tag[j] indicates that the arriving packet j will be forwarded when the total bytes serviced reaches its current value, plus the current queue length Qlen.

For example, when packet j arrives, if 100 Kbytes of foreground traffic and background traffic R[k] have been serviced, and Qlen is 10,000 bytes, the Required_bytes_svc_tag [j] is 110 Kbytes for packet j. The scheduler list is thus a linked list of Required_bytes_svc_tag[j] values for each packet that has arrived, was not discarded, and has yet to be forwarded.

In step 512, the foreground packet queue length Qlen is updated, according to Qlen=Qlen+pklen[j]. It is then determined (step 514) whether the updated queue length Qlen exceeds the maximum permissible queue length Qmax. If so, in step 516, the packet is discarded, and the affected variables must be recalculated, i.e., Qlen is reduced by pktlen[j]; the Required_bytes_svc_tag[j] associated with the discarded packet pkt[j] is removed from the scheduler list; and the packet itself is removed from the packet queue 180. Also in step 516, the total packets lost index I is incremented (I=I+1); and the Tot_bytes_lost variable is incremented (Tot_bytes_lost=Tot_bytes_lost+pktlen[j]).

If the simulated queue length Qlen is not greater than the maximum queue length Qmax after adding the packet length of the packet received in step 512, the process returns to step 506 to wait for the next event.

If, in step 506, a start of the next timeslot is detected instead of a packet, the timeslot index is incremented (k=k+1), and, using the "Min" function, indicator variables are set to zero or one to indicate if any of the four simulated queues are empty or non-empty as follows (step 518):

$$y[k]=\text{Min}(Qlen,1); y1[k]=\text{Min}(Qlen1,1);$$

$$y2[k]=\text{Min}(Qlen2,1); y3[k]=\text{Min}(Qlen3,1)$$

Specifically, in step 518, the cumulative counts of total bytes serviced for each CoS is then calculated for the new timeslot k as follows (note, "floor" is a C program command to round to the next lowest integer and will be used in the following to denote the integer part of the argument passed to it):

First Set $$S=w*y[k]+w1*y1[k]+w2*y2[k]+w3*y3[k];$$

Then Set $$\text{Tot\_bytes\_svc}=\text{Tot\_bytes\_svc}+\text{Min}(Qlen, \text{floor}((T0*(1/8)*C*w*y[k])/S));$$

$$\text{Tot\_bytes\_svc1}=\text{Tot\_bytes\_svc1}+\text{Min}(Qlen1, \text{floor}((T0*(1/8)*C*w1*y1[k])/S));$$

$$\text{Tot\_bytes\_svc2}=\text{Tot\_bytes\_svc2}+\text{Min}(Qlen2, \text{floor}((T0*(1/8)*C*w2*y2[k])/S)); \text{ and}$$

$$\text{Tot\_bytes\_svc3}=\text{Tot\_bytes\_svc3}+\text{Min}(Qlen3, \text{floor}((T0*(1/8)*C*w3*y3[k])/S)).$$

The foregoing equations allocate bandwidth based on the weights assigned to each CoS and whether, in that timeslot, a CoS queue contains bytes to be forwarded. The following example illustrates the allocation of bandwidth:

where, T0=1 sec and C=800 KBits/sec=100 Bytes/sec;

assume all classes are weighted equally (25%), thus, w=w1=w2=w3=25;

assume in this case y[k]=y1[k]=1 (nonempty) and y2[k]=y3[k]=0 (empty);

then S=50; and assuming both Qlen and Qlen1 are greater than 50 KBytes, $$\text{Tot\_bytes\_svc}=\text{Tot\_bytes\_svc}+50 \text{ KBytes}$$

$$\text{Tot\_bytes\_svc1}=\text{Tot\_bytes\_svc1}+50 \text{ KBytes}.$$

Thus, the total bytes serviced variables for the two non-empty and equally weighted class of services have been increased by half the total bytes serviced by the port for that timeslot (i.e., ½*T0*C=½*100 KBytes each), thus allocating the foreground packet CoS and CoS1 half the bandwidth for that timeslot. No bandwidth is allocated to the empty queues. It can be seen that if w1 was given a higher value (and greater weight) than w, the foregoing equations would result in w1 begin allocated more bandwidth than w. For example, in the same example above, if w1 is assigned a weight of 3 times w, Tot_bytes_svc would be increased by 25 KBytes, and Tot_bytes_svc1 would be increased 75 KBytes, thereby allocating three times the bandwidth to CoS1.

After updating the total bytes serviced variables, it is determined whether the earliest Required_bytes_svc_tag[i] in the forwarding schedule list has a value of less than or equal to Tot_bytes_svc, and if so, that packet is forwarded to the egress media interface 160, and the counter i is incremented by one (steps 520, 522 and 524). For example, if the Tot_bytes_svc calculation in step 518 equaled 1050 Kbytes, and the Required_bytes_svc_tag[i] for the earliest item (lowest i) in the forwarding schedule list had value of 1025 KBytes (calculated in step 510), that ith packet is forwarded (i.e., serviced) in step 524.

Alternatively, if, for example, the next tag (Required_bytes_svc_tag[i+1]) in the list had a value of 1100 Kbytes, Tot_bytes_svc (1050 KBytes) would be less than the Required_bytes_svc_tag[i+1], the packet corresponding to that tag would not be forwarded (i.e., serviced), and the process proceeds to step 526. Accordingly, this process (steps 520, 522, and 524) is repeated until all packets with Required_bytes_svc_tag[j]<=Tot_bytes_svc have been forwarded.

Note, as explained above with reference to FIG. 5, the index i is used by the FPSF 170 to reference the Required_bytes_svc_tag[i] items in the forwarding schedule list, and is incremented for each tag in the list corresponding to successive foreground traffic packets j scheduled for forwarding.

If no packets remain in the scheduler list with a Required_bytes_svc_tag[j]<=Tot_bytes_svc, FPSF 170 (in step 526) then reads new background traffic rates R[k], R1[k], R2[k], and R3[k] from each respective background traffic generator, 190, 200, 500, and 502, for each CoS, and updates the Tot_bytes_gen counters according to $$\text{Tot\_bytes\_gen}=\text{Tot\_bytes\_gen}+R[k]*T0;$$

$$\text{Tot\_bytes\_gen1}=\text{Tot\_bytes\_gen1}+R1[k]*T0;$$

$$\text{Tot\_bytes\_gen2}=\text{Tot\_bytes\_gen2}+R2[k]*T0; \text{ and}$$

$$\text{Tot\_bytes\_gen3}=\text{Tot\_bytes\_gen3}+R3[k]*T0.$$

The background traffic rates can be updated as in the previous embodiments, in the manner illustrated in FIG. 6 discussed above. The simulated queue lengths are then updated as follows (step 528):

$$a[k] = R[k] - ((1/8)*C*w*y[k])/S;$$

$$a1[k] = R1[k] - ((1/8)*C*w1*y1[k])/S;$$

$$a2[k] = R2[k] - ((1/8)*C*w2*y2[k])/S;$$

$$a3[k] = R3[k] - ((1/8)*C*w3*y3[k])/S,$$

with S as defined in step 518, then $$Qlen = \text{Max}(Qlen + T0*a[k], 0);$$

$$Qlen1 = \text{Max}(Qlen1 + T0*a1[k], 0);$$

$$Qlen2 = \text{Max}(Qlen2 + T0*a2[k], 0); \text{ and}$$

$$Qlen3 = \text{Max}(Qlen3 + T0*a3[k], 0).$$

The Max(Qlen+To*a[k], 0) relation is used in case, as previously discussed, a[k] is a negative value, which occurs if the background traffic rate is less than the bandwidth allocated for a particular timeslot. In this case if the magnitude of a[k]*T0 were greater than Qlen, a negative valued Qlen results upon performing the update, but since Qlen, Qlen1, Qlen2, and Qlen3 must each be nonnegative (i.e., bounded below by zero), the Max function is used.

The total bytes lost counters are then updated as follows:

$$\text{Tot\_bytes\_lost} = \text{Tot\_bytes\_lost} + \text{Max}((\text{Max}(Qlen, 0) - Q\text{Max}), 0);$$

$$\text{Tot\_bytes\_lost1} = \text{Tot\_bytes\_lost1} + \text{Max}((\text{Max}(Qlen1, 0) - Q\text{Max1}), 0);$$

$$\text{Tot\_bytes\_lost2} = \text{Tot\_bytes\_lost2} + \text{Max}((\text{Max}(Qlen2, 0) - Q\text{Max2}), 0); \text{ and}$$

$$\text{Tot\_bytes\_lost3} = \text{Tot\_bytes\_lost3} + \text{Max}((\text{Max}(Qlen3, 0) - Q\text{Max3}), 0).$$

Of course, if Qlen is greater than Qmax, the total bytes lost are increased by the amount Qlen exceeds Qmax.

Lastly, prior to again returning to waiting for a packet arrival or next timeslot event to occur (step 506), the queue length variables are upper bounded by the maximum values:

$$Qlen = \text{Min}(Qlen, Q\text{max}); Qlen1 = \text{Min}(Qlen1, Q\text{max1});$$

$$Qlen2 = \text{Min}(Qlen2, Q\text{max2}); Qlen3 = \text{Min}(Qlen3, Q\text{max3})$$

After updating the simulated queue lengths and total bytes lost counters, the process returns to step 506 to wait for another packet arrival or timeslot event.

It can be seen that using the embodiment of FIGS. 7-8 described herein, a one can emulate the effect of multiple classes of services, each having different weights, and determine the effect of such on foreground data packets and one another. Packets generated, lost, forwarded, etc. statistics are kept for each class of service, and the foreground traffic, enabling one to accurately emulate the effect of multiple classes of service on a particular network configuration and bandwidth.

It will be apparent to those skilled in the art that additional various modifications and variations can be made consistent with the present invention without departing from the scope or spirit of the invention. For example, if it is desired to simulate the queuing effects of a given background traffic load alone without emulating foreground traffic, one could use the tot_bytes_gen and tot_bytes_lost statistics to examine the behavior of the node emulator subject to that background traffic. In this case, the node emulator would function solely to provide queuing simulation information in real time. Also, the foreground traffic could be assigned a separate weighted queue the background traffic generator R[k] disabled, or simply, would not share a queue with simulated background traffic. As such, the emulator would, for example, function as shown in FIG. 8, and Qlen would still be weighted with respect to the other simulated queues, but would be devoted only to foreground packets.

Other embodiments consistent with the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of emulating network traffic through a physical node comprising:
   (a) generating foreground traffic through the node, wherein the foreground traffic includes data packets;
   (b) simulating, at the node, a first background traffic and assigning a first simulated weight to the simulated first background traffic, the first simulated weight specifying a first proportion of available bandwidth capacity to be allocated to the first background traffic;
   (c) simulating, at the node, a second background traffic, for contention of the simulated second background traffic and the simulated first background traffic with the foreground traffic at the node and assigning a second simulated weight to the simulated second background traffic, the second simulated weight specifying a second proportion of available bandwidth capacity to be allocated to the simulated second background traffic, wherein the first simulated weight and the second simulated weight are different;
   (d) determining an effect of the simulated first and simulated second background traffic on the foreground traffic, wherein determining comprises:
      simulating a first queue and a second queue, the simulated first queue servicing the generated foreground traffic and the first background traffic, and the second simulated queue servicing the second background traffic;
      computing a size of the first simulated queue and a size of the second simulated queue, wherein the computing comprises calculating rates of growth for the first and second simulated queues; and
      determining the effect based on the computed sizes of the first and second simulated queues; and
   (e) making a forwarding decision with respect to the foreground traffic based on the effect, wherein the forwarding decision comprises one of forwarding a data packet through the node and discarding the data packet.

2. The method of claim 1, wherein the forwarding decision includes delaying the data packet.

3. The method of claim 1, wherein the forwarding decision includes scheduling the packet for forwarding.

4. The method of claim 1, wherein step (d) further includes allocating bandwidth of the node to each of the first and second simulated queues based on the first and second simulated weights, respectively.

5. The method of claim 4, wherein the forwarding decision includes discarding foreground traffic when it is determined that the foreground traffic would cause the first simulated queue to overflow.

6. The method of claim 1, wherein step (a) includes receiving the foreground traffic from a client coupled to the node and transmitting the foreground traffic through the node.

7. The method of claim 6, wherein step (a) includes transmitting the foreground traffic through the node between a client and a server coupled to the node.

8. The method of claim 1, wherein steps (b) and (c) include simulating a first and second rate of background traffic, respectively.

9. The method of claim 8, wherein the first and second simulated rates simulate a number of bytes per second.

10. The method of claim 9, wherein the number of bytes per second is randomly selected.

11. The method of claim 10, wherein the simulated rate is assigned via a lookup table.

12. A node emulator comprising:
    an ingress media interface;
    a packet queue to receive incoming foreground traffic from the ingress media interface;
    an egress media interface;
    at least first and second background traffic generators to simulate first and second background traffic, for contention of the simulated first background traffic and the simulated second background traffic with the foreground traffic, and to assign first and second simulated weights associated therewith at the node emulator, wherein the simulated weights specify relative proportions of available bandwidth capacity to be allocated to each traffic, and wherein the first and second simulated weights are different; and
    a foreground packet scheduler/forwarder to cause foreground traffic to be forwarded from the packet queue to the egress media interface, wherein the foreground packet scheduler/forwarder is configured to:
        simulate a first queue and a second queue, the simulated first queue servicing the generated foreground traffic and the first background traffic, and the simulated second queue servicing the second background traffic;
        compute a size of the first simulated queue and a size of the second simulated queue, wherein the computing comprises calculating rates of growth for the first and second simulated queues; and
        determine an effect of the first simulated background traffic and second simulated background traffic on the generated foreground traffic, the effect being based on the computed sizes of the first and second simulated queues.

13. The node emulator of claim 12, wherein the foreground packet scheduler forwarder makes a forwarding decision with respect to foreground traffic in the packet queue, the forwarding decision being dependent on the effect.

14. The node emulator of claim 13, wherein the foreground traffic includes data packets.

15. The node emulator of claim 14, wherein the forwarding decision comprises one of forwarding a data packet from the packet queue to the egress media interface or discarding the data packet.

16. The node emulator of claim 15, wherein the forwarding decision includes scheduling the packet for forwarding.

17. The node emulator of claim 12, wherein the foreground packet scheduler forwarder allocates bandwidth of the node to each of the first and second simulated queues based on the first and second simulated weights, respectively.

18. The node emulator of claim 12, wherein the foreground packet forwarder scheduler comprises a software application running on the node emulator.

19. A system to emulate the effect of background traffic on foreground traffic comprising:
    a client to generate foreground traffic;
    a node emulator coupled to the client to receive and forward the foreground traffic wherein the node emulator assigns a first simulated weight to the foreground traffic and to simulate a background traffic, for contention of the simulated background traffic with the foreground traffic, wherein the node emulator assigns a second simulated weight to the simulated background traffic, the simulated weights specifying relative proportions of available bandwidth capacity to be allocated, wherein the first simulated weight and second simulated weight are different, wherein the node emulator is further configured to:
        simulate a queue, the simulated queue servicing the foreground traffic and the simulated background traffic;
        compute a size of the simulated queue, wherein the computing comprises calculating a rate of growth for the simulated queue; and
        determine an effect of the simulated background traffic on the foreground traffic, the effect being based on the computed size of the simulated queue; and
    a server coupled to the node to receive foreground traffic forwarded from the node emulator.

20. The system of claim 19, wherein the node emulator allocates bandwidth to the foreground traffic and simulated background traffic based on the first and second simulated weights, respectively.

* * * * *